3,479,433
METHODS FOR STIMULATING GROWTH OF ANIMALS WITH PHOSPHOCREATININE
Gerard Paul Marie Henri Loiseau, Sceaux, France, assignor to Ugine Kuhlman, Paris, France
No Drawing. Filed Feb. 13, 1967, Ser. No. 615,393
Claims priority, application France, Feb. 11, 1969, 49,259
Int. Cl. A61k 27/00
U.S. Cl. 424—200                2 Claims

ABSTRACT OF THE DISCLOSURE

The present invention relates to an animal feed composition comprising an animal feed and a growth-promoting amount of phosphocreatinine. It also relates to a method of stimulating growth of animals which comprises feeding said animals an animal feed composition comprising animal feed and an effective amount of phosphocreatinine for growth stimulation.

---

This invention relates to a process for stimulating the growth of animals. It also relates to animal feed which can be used for this purpose.

According to the the present invention there is provided animal feed composition comprising an animal feed and a growth-promoting amount of phosphocreatinine. By means of the present invention it has been found that the addition of phosphocreatinine to animal feed is a particularly effective means for accelerating the growth of young creatures.

Phosphocreatinine is a compound which, in the form of its sodium salt, corresponds to the formula:

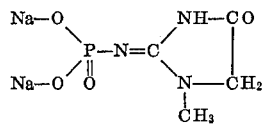

This salt crystallises with five molecules of water. It is a practically non-toxic substance. When it is administered to rats or mice at doses up to 3 g. per kg. of animal weight, either orally or intraperitoneally, no disturbance is found in their behaviour.

The supply of phosphocreatinine in the animal feed can be provided by dissolving the abovementioned salt in drinking water or by incorporating in the feed, including feed prepared by the stock-breeder or feeds called "composites" prepared industrially.

The process of the present invention is applicable to all growing animals. It is particularly advantageous in the case of the animals bred on acount of the edibility of their flesh, such as poultry, pigs, sheep and cattle. The process of the present invention enables the speed of the gain in weight to be increased. The growth curve of the treated animals is constantly above that of control animals subjected to the same feeding system but without phosphocreatinine. The use of phosphocreatinine enables a better yield in meat to be obtained from the food rations. An unbalanced feed can give slack and puffy tissues in the meat. Supplying phosphocreatinine enables this disadvantage to be overcome. Whilst the present invention is not bound by any theory of its operation it is believed that its advantage can be explained by the fact that phosphocreatine, which is essential to life and to the development of the muscular tissue, is advantageously put at the disposal of the organism by the phosphocreatinine, which is more stable in the digestive juices than phosphocreatine.

The presence of phosphocreatinine in the animal organism, especially in the muscles, does not present any danger to human food. Indeed, this substance exists naturally in the tissues of vertebrates. From the dietetic point of view it may be considered as one of the principal sources of energy in uncooked or raw meats. The absence of toxicity of the disodium salt of phosphocreatinine, the natural character of its degradation products, and the quality of the meat provided by animals reared on phosphocreatinine are notable advantages which make this new growth-promoter particularly valuable.

The following examples, to which the invention is not restricted, illustrate the process of the present invention and described some feeding recipes.

EXAMPLE 1.—FEED FOR REARING CALVES

A daily mineral complement of 1 kg., comprising the following components:

Rye _____kg__ 0.350
Bran _____kg__ 0.220
Cottonseed cake _____kg__ 0.300
Bone meal _____kg__ 0.030
Sodium phosphate _____kg__ 0.100
Phosphocreatinine _____mg__ .500 is added to the usual feed (corn, barley, soya cake). This complement is given for 10 months.

EXAMPLE 2.—FEED FOR HEIFERS AND COWS BEING FATTENED

In addition to the normal feed, the following mineral complement is given at the rate of 1 kg. per animal per day:

Linseed cake _____kg__ 0.500
Barley _____kg__ 0.200
Bran _____kg__ 0.200
Sodium phosphate _____kg__ 0.070
Bone meal _____kg__ 0.030
Phosphocreatinine _____g__ 3

This complement is given for alternate periods of 3 months during a period of 24 months.

EXAMPLE 3.—FEED FOR REARING SHEEP

The mineral complement below is added to the usual food at the rate of 0.5 kg. per animal per day:

Linseed cake _____kg__ 0.260
Skimmed milk _____kg__ 0.130
Calcium carbonate _____kg__ 0.020
Sodium phosphate _____kg__ 0.025
Sodium chloride _____kg__ 0.055
Manganese sulphate _____kg__ 0.007
Copper sulphate _____kg__ 0.003
Phosphocreatinine _____mg__ 250

This complement is given for 8 months.

EXAMPLE 4—FEED FOR REARING PIGS

The ration described below is distributed at the rate of 3 kg. per day:

| | |
|---|---|
| Barley | kg 1.530 |
| Carob (locust bean) | kg 0.150 |
| Manioc (cassava) | kg 0.120 |
| Corn bran | kg 0.810 |
| Ground-nut cake | kg 0.090 |
| Cooked soya bean | kg 0.060 |
| Meat meal | kg 0.060 |
| Dried lucerne | kg 0.090 |
| Vitaminised mineral concentrate | kg 0.090 |
| Phosphocreatinine | mg 300 |

This diet is given for 4 to 5 months.

EXAMPLE 5—FEED FOR INTENSIVE REARING OF POULTRY

In addition to the complete food comprising the following components:

| | Kg. |
|---|---|
| Barley | 0.066 |
| Maize | 0.070 |
| Bran | 0.010 |
| Ground-nut meal | 0.010 |
| Soya bean | 0.008 |
| Fish meal | 0.010 |
| Meat meal | 0.006 |
| Barm (brewer's yeast) | 0.010 |
| Mineral mixture | 0.010 |
| | 0.200 |

30 cc. of drinking water containing 1 per 1000 of phosphocreatinine is given to each animal per day. This diet is maintained for two months.

EXAMPLE 6

28 chicks (lot I) are given a daily dose of 5 mg./kg. of the sodium salt of phosphocreatinine for 30 days by incorporating it in the drinking water.

These chicks are weighed at regular intervals, as were the chicks of a control lot (lot II) comprising 27 members of the same race and the same age. The results obtained are given in the following Table I in which J represents the date of birth.

TABLE I.—EVOLUTION OF THE GROWTH

| Date of weighing | Weight average (g.) | |
|---|---|---|
| | Lot II | Lot I |
| J | 34 | 34.7 |
| J+1 | 34 | 34.8 |
| J+4 | 41.5 | 43.8 |
| J+6 | 42.1 | 46.1 |
| J+8 | 50.1 | 50.9 |
| J+11 | 66.9 | 71 |
| J+13 | 81.2 | 86.8 |
| J+15 | 96.7 | 101.8 |
| J+18 | 123.4 | 139.8 |
| J+20 | 142.5 | 161.2 |
| J+22 | 167.3 | 193.7 |
| J+24 | 205.6 | 234.4 |
| J+26 | 229.7 | 258 |
| J+28 | 259.8 | 287.5 | for the animals treated, the increase in weight average is therefore 10.7. The following Table II shows besides that the number of deaths is found to be reduced by the treatment.

TABLE II.—MORTALITY FROM BIRTH

| | Lot II | Lot I |
|---|---|---|
| J+11 | 6 | 2 |
| J+13 | 8 | 2 |
| J+28 | 8 | 2 |

I claim:
1. A method of stimulating growth of animals which comprises feeding said animals an animal feed composition comprising an animal feed and an effective amount of phosphocreatinine for growth stimulation.
2. A method according to claim 1 wherein the phosphocreatinine is in the form of the sodium salt.

References Cited

Chem. Abst. 65, p. 7525h, (1966).

ALBERT T. MEYERS, Primary Examiner

S. J. FRIEDMAN, Assistant Examiner

U.S. Cl. X.R.

99—2

UNITED STATES PATENT OFFICE
CERTIFICATE OF CORRECTION

Patent No. 3,479,433                    Dated November 18, 1969

Inventor(s) GERARD PAUL MARIE HENRI LOISEAU

It is certified that error appears in the above-identified patent and that said Letters Patent are hereby corrected as shown below:

In the heading at the top of column 1, the year in which French application 49,259 for which priority is claimed was filed should be --1966-- instead of "1969".

SIGNED AND
SEALED
JUN 9 1970

(SEAL)
Attest:

Edward M. Fletcher, Jr.
Attesting Officer

WILLIAM E. SCHUYLER, JR.
Commissioner of Patents